United States Patent

Orian et al.

Patent Number: 5,884,089
Date of Patent: Mar. 16, 1999

[54] METHOD FOR CALCULATING AN L1 NORM AND PARALLEL COMPUTER PROCESSOR

[75] Inventors: Effi Orian, Pardessia; Yaron Ben-Arie, Ramat-Gan; Dan Tamir, Raanana, all of Israel; Shao-Wei Pan, Lake Zurich, Ill.

[73] Assignee: Motorola, Inc., Schaumburg, Ill.

[21] Appl. No.: 949,975

[22] Filed: Oct. 14, 1997

[51] Int. Cl.[6] ................................................. G06F 15/00
[52] U.S. Cl. ........................... 395/800.01; 395/800.25; 364/730; 364/736.03
[58] Field of Search ..................... 395/800.01, 800.1, 395/800.25, 800.28; 364/715.012, 730, 736.03

[56] References Cited

U.S. PATENT DOCUMENTS 5,610,850  3/1997  Uratani et al. ..................... 364/769
5,657,263  8/1997  Lloyd et al. ....................... 364/748.5

Primary Examiner—Eric Coleman
Assistant Examiner—Mackly Monestime
Attorney, Agent, or Firm—James E. Gauger

[57] ABSTRACT

A parallel computer processor that performs L1 norm calculations includes a plurality of processing elements and a data pipeline which couples the processing elements. The data vectors for which the L1 norm is to be calculated are stored in storage lines of a cache memory. In operation each processing element accesses data in its private storage column in the cache memory and calculates a term signal. The term signals are added to form the resulting L1 norm.

7 Claims, 5 Drawing Sheets

$$\vec{y}_1 = \begin{pmatrix} y_{11} \\ y_{12} \\ y_{13} \\ y_{14} \end{pmatrix}$$

$$\vec{y}_2 = \begin{pmatrix} y_{21} = y_{12} \\ y_{22} = y_{13} \\ y_{23} = y_{14} \\ y_{24} \end{pmatrix}$$

$$\vec{y}_3 = \begin{pmatrix} y_{31} = y_{22} \\ y_{32} = y_{23} \\ y_{33} = y_{24} \\ y_{34} \end{pmatrix}$$

METHOD FOR CALCULATING AN L1 NORM AND PARALLEL COMPUTER PROCESSOR

RELATED INVENTIONS

The present invention is related to the following inventions which are assigned to the same assignee as the present invention:

(1) "Computer Processor Utilizing Logarithmic Conversion and Method of Use thereof", having Ser. No. 08/403,158, filed on Mar. 13, 1995.

(2) "Exponentiator Circuit Utilizing Shift Register and Method of Using Same", having Ser. No. 08/401,515, filed on Mar. 10, 1995.

(3) "Accumulator Circuit and Method of Use Thereof", having Ser. No. 08/455,927, filed on May 31, 1995.

(4) "Logarithm/Inverse-Logarithm Converter and Method of Using Same", having Ser. No. 08/381,368, filed on Jan. 31, 1995.

(5) "Logarithm/Inverse-Logarithm Converter Utilizing Second Order Term and Method of Using Same", having Ser. No. 08/382,467, filed on Jan. 31, 1995.

(6) "Logarithm/Inverse-Logarithm Converter Utilizing Linear Interpolation and Method of Using Same", having Ser. No. 08/391,880, filed on Feb. 22, 1995.

(7) "Logarithm/Inverse-Logarithm Converter Utilizing a Truncated Taylor Series and Method of Use Thereof", having Ser. No. 08/381,167, filed on Jan. 31, 1995.

(8) "Logarithm Converter Utilizing Offset and Method of Use Thereof", having Ser. No. 08/508,365, filed on Jul. 28, 1995.

(9) "Computer Processor Using Logarithmic Conversion and Method of Use Thereof", having Ser. No. 08/430,158, filed on Mar. 13, 1995.

TECHNICAL FIELD OF THE INVENTION

The present invention relates generally to digital signal processing and, in particular, to a method and system for implementing an L1 norm operation.

BACKGROUND OF THE INVENTION

Computer processors are well known and widely used for a variety of purposes. One application of computer processors is digital signal processing (DSP). By definition, digital signal processing is connected with the representation of signals by sequences of numbers or symbols and the processing of these signals. DSP has a wide variety of applications and its importance is evident in such fields as pattern recognition, radio communications, telecommunications, radar, biomedical engineering, and many others.

At the heart of every DSP system is a computer processor that performs mathematical operations on signals. Generally, signals received by a DSP system are first converted to a digital format used by the computer processor. Then the computer processor executes a series of mathematical operations on the digitized signal. The purpose of these operations can be to estimate characteristic parameters of the signal or to transform the signal into a form that is in some sense more desirable. Such operations typically implement complicated mathematics and entail intensive numerical processing. Examples of mathematical operations that may be performed in DSP systems include matrix multiplication, matrix-inversion, Fast Fourier Transforms (FFT), auto and cross correlation, Discrete Cosine Transforms (DCT), polynomial equations, and difference equations in general, such as those used to approximate Infinite Impulse Response (IIR) and Finite Impulse Response (FIR) filters.

Computer processors vary considerably in design and function. One aspect of a processor design is its architecture. Generally, the term computer architecture refers to the instruction set and organization of a processor. An instruction set is a group of programmer-visible instructions used to program the processor. The organization of a processor, on the other hand, refers to its overall structure and composition of computational resources, for example, the bus structure, memory arrangement, and number of processing elements. A processing element may be as simple as an adder circuit that sums two values, or it may be a complex as a central processing unit (CPU) that performs a wide variety of different operations.

In a computer, a number of different organizational techniques can be used for increasing execution speed. One technique is execution overlap. Execution overlap is based on the notion of operating a computer like an assembly line with an unending series of operations in various stages of completion. Execution overlap allows these operations to be overlapped and executed simultaneously.

One commonly used form of execution overlap is pipelining. In a computer, pipelining is an implementation technique that allows a sequence of the same operations to be performed on different arguments. Computation to be done for a specific instruction is broken into smaller pieces, i.e., operations, each of which takes a fraction of the time needed to complete the entire instruction. Each of these pieces is called a pipe stage. The stages are connected in a sequence to form a pipeline—arguments of the instruction enter at one end, are processed through the stages, and exit at the other end.

These are many different architectures, ranging from complex-instruction-set-computer (CISC) to reduced-instruction-set-computer (RISC) based architectures. In addition, some architectures have only one processing element, while others include two or more processing elements. Despite differences in architectures, all computer processors have a common goal, which is to provide the highest performance at the lowest cost. However, the performance of a computer processor is highly dependent on the problem to which the processor is applied, and few, if any, low-cost computer processors are capable of performing the mathematical operations listed above at speeds required for some of today's more demanding applications. For example, MPEG data compression of an NTSC television signal can only be performed using expensive supercomputers or special purpose hardware.

Many other applications, such as matrix transformations in real-time graphics, require data throughput rates that exceed the capabilities of inexpensive, single processors, such as micro processors and commercially available DSP chips. Instead, these applications require the use of costly, multiprocessor or multiple-processor computers. Although multiprocessor computers typically have higher throughput rates, they also include complex instruction sets and are generally difficult to program.

One application which is particularly expensive in terms of the required computing power is the calculation of L1 norms. The L1 norm of a vector $\vec{x}$ and a vector $\vec{y}_i$ is defined as follows:

$$L1(\vec{x}, \vec{y}_i) = |x_1 - y_{i1}| + |x_2 - y_{i2}| + |x_3 - y_{i3}| + \ldots + |x_n - y_{in}| \quad \text{(Equation 1)}$$

where $$\vec{x} = \begin{pmatrix} x_1 \\ x_2 \\ x_3 \\ \cdot \\ \cdot \\ \cdot \\ x_n \end{pmatrix}$$ (Equation 2)

$$\vec{y_i} = \begin{pmatrix} y_{i1} \\ y_{i2} \\ y_{i3} \\ \cdot \\ \cdot \\ \cdot \\ y_{in} \end{pmatrix}$$ (Equation 3)

Another way to express equation (1) is given in the following equation (4):

$$L1(\vec{x}, \vec{y_i}) = \sum_{j=1}^{n} |x_j - y_{ij}|$$ (Equation 4)

The calculation of the L1 norm of two data vectors $\vec{x}$ and $\vec{y_i}$ is needed in a large variety of digital signal processing applications. A typical requirement is that the L1 norm is calculated for a very large number of vector pairs. Such a requirement cannot be fulfilled by state of the art microprocessors or digital signal processors. Only supercomputers provide adequate computing power, but are prohibitively expensive for most applications.

Thus, there is a need for a method for effectively calculating an L1 norm and an improved parallel computer processor implementing such an improved method.

SUMMARY OF THE INVENTION

The invention is pointed out with particularity in the appended claims. Preferred embodiments of the invention are given in the dependent claims.

The invention is advantageous in that it allows to calculate an L1 norm in a highly parallel way. Each processing element of the parallel computer processor which carries out the L1 norm calculation computes one particular term signal of the L1 norm. Since the processing elements can work in parallel, this allows to generate one L1 norm every clock cycle provided that each processing element requires just one clock cycle for the calculation of one particular term signal.

The further advantage is that the L1 norm can be calculated by making usage of a pipelined data structure. Once the data pipeline is established, the shifting in of new data can be performed very efficiently, especially if the data vectors in subsequent L1 norms calculations have a high degree of similarity.

This pipelined approach can be supported if the adder which is used for adding all the term signals delivered by the processing elements is also working in a pipelined way. This can be accomplished, if an adder tree of the type of the accumulator circuit disclosed in above-identified related invention number 3 (Ser. No. 08-455,927) is used.

One field in which the method and parallel computer for calculating an L1 norm is particularly beneficial is in the field of finding the best match between a first vector and a plurality of second vectors. To find the best match, all possible L1 norms between the first vector and the second vectors have to be calculated. For a problem of this type the application of the invention results in a dramatically reduced computing time. This is particularly important for motion estimation in which a block matching method is used.

Block matching methods are often used for motion estimation according to the MPEG-standard. An example of a block matching method is shown in Musmann, H. G.; Pirsch, P.; Grallert, H. D.: Advances in Picture Coding. Proc. IEEE 73 (1985), No. 4, page 523–548. For such calculations, full advantage is taken of the similarity between vectors being descriptive of corresponding blocks in subsequent video frames.

The pipelined parallel structure of the invention allows to shift in only those data elements which vary from one vector to the other in subsequent L1 norm operations so that each clock cycle a new L1 norm can be generated. Subsequently, the sequence of L1 norm can be evaluated to find the minimal L1 norm being representative of the best match.

BRIEF DESCRIPTION OF THE DRAWINGS

The invention will become more apparent and will be best understood by referring to the following detailed description of a preferred embodiment in conjunction with the accompanying drawings, in which.

DETAILED DESCRIPTION OF PREFERRED EMBODIMENTS

Figure 1:
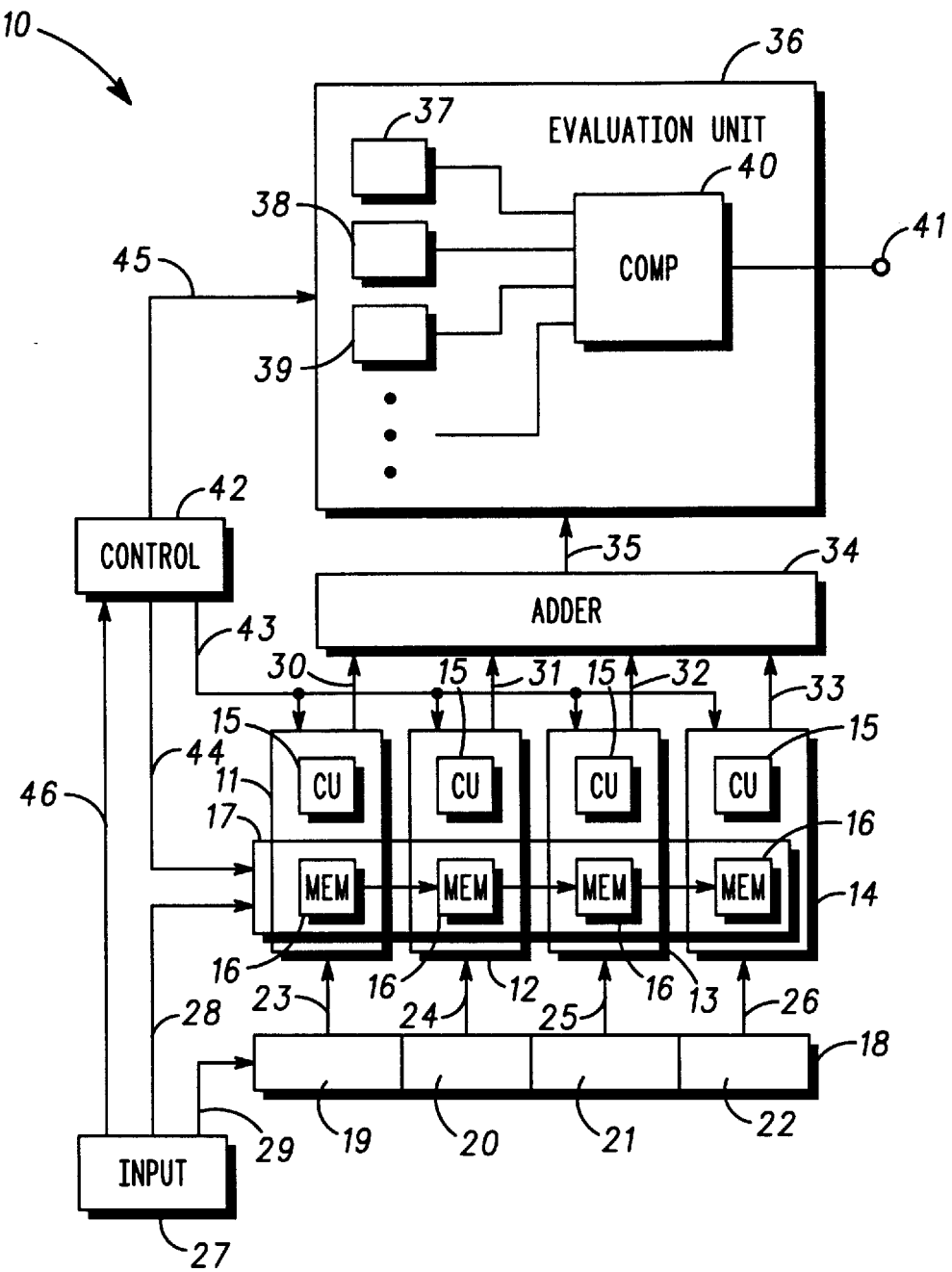
FIG. 1 illustrates a block diagram of a first parallel computer processor that can incorporate an embodiment of the present invention.

Referring to FIG. 1, a first embodiment of a parallel computer processor of the invention is described in more details in the following. The parallel computer processor 10 comprises a plurality of processing elements 11, 12, 13 and 14. Each of the processing elements has a computing unit 15 and a memory 16. Each memory 16 is interconnected to its neighboring memory 16 to allow shifting of data from one memory 16 to the next. Thereby a data pipeline 17 is formed. As a consequence the data pipeline 17 interconnects the processing elements 11, 12, 13 and 14 by providing the means to shift the content of the memory 16 of one processing element to the memory 16 of the next processing element. The coupled memories 16 of the data pipeline 17 provide for one storage line which can hold a data vector.

A second storage line is provided by cache memory 18. The cache memory 18 comprises memory cells 19, 20, 21, and 22. Each memory cell—like each memory 16—can hold one data vector element. Each memory cell of the cache memory 18 is coupled to one of the processing elements 11, 12, 13 and 14 by a dedicated bus 23, 24, 25, and 26, respectively. Input data vectors are shifted in the data pipeline 17 from the input 27 via bus 28 coupling the input 27 to the data pipeline 17. The cache memory 18 can be loaded with a data vector from the input 27 via bus 29 which couples the input 27 to the cache memory 18.

The processing elements 11, 12, 13, and 14 have term signal outputs 30, 31, 32, and 33. The term signal outputs 30, 31, 32, and 33 couple the processing elements 11, 12, 13, and 14 to adder 34. Adder 34 adds all the term signals delivered by the processing elements 11, 12, 13, and 14 to generate one sum signal at adder output 35; preferably the adder 34 is designed according the principles disclosed in the above-identified related invention No. 3 (Ser. No. 08-455,927).

As an option the adder output 35 is coupled to an evaluation unit 36—if, for example, a sequence of L1 norms is calculated for block matching or other kinds of analysis. By way of example the evaluation unit 36 shown in FIG. 1 has a number of storage locations 37, 38, and 39. In each of the storage locations 37, 38, and 39 one L1 norm can be stored. The storage locations 37, 38, and 39 as well as other storage locations not shown in the drawings for simplicity are coupled to comperator 40 in order to select the smallest L1 norm to find the best match between a pair of data vectors. The comparator 40 issues a match signal at output 41 of the evaluation unit 36. The match signal is indicative of the pair of data vectors having the smallest L1 norm.

The operation of the processor 10 is controlled by control unit 42. The control unit 42 is coupled via control bus 43 to the processing elements 11, 12, 13, and 14 and, in particular, via control bus 44 to the data pipeline 17. In addition, the control unit 42 also controls the operation of evaluation unit 36 via control bus 45. Further, the control unit 42 is coupled via input line 46 to the input 27 to receive a shift parameter $S_i$.

In operation first a data vector $\vec{x}$ having N=4 data $x_1$, $x_2$, $x_3$, and $x_4$ is shifted in. The data of the vector $\vec{x}$ is loaded to the cache memory 18 by shifting in the data of vector $\vec{x}$ in reverse order. In other words, first the data $x_1$ is inputted at input 27 and sent via bus 29 to the cache memory 18 in which it is eventually stored in memory cell 22. Likewise the further data $x_2$, $x_3$ and $x_4$ of the vector $\vec{x}$ are stored in the memory cells 21, 20, and 19, respectively. As a consequence of the loading of the data of vector $\vec{x}$ into the cache memory 18 the vector $\vec{x}$ is available for processing by the processor 10. The cache memory 18 constitutes one storage line for holding all the data of the vector $\vec{x}$. If the processor 10 shall be able to accept vectors of dimensions other than N=4, it is necessary to provide the equivalent number of N memory cells in the cache memory 18 as well as the equivalent number N of processing elements connected to the memory cells.

Also a data vector $\vec{y}_1$ is loaded into the processor 10 via input 27. The vector $\vec{y}_1$ has the same number N=4 of data as the vector $\vec{x}$, i.e. $y_{11}$, $Y_{12}$, $Y_{13}$, and $Y_{14}$. Again the vector $\vec{y}_1$ is loaded into the processor 10 in reverse order. This is accomplished by first inputting the data $y_{11}$ at the input 27 and sending the data $y_{11}$ via the bus 28 to the data pipeline 17 in which the data $y_{11}$ is initially stored in the memory 16 of the processing element 11 which comes first in the data pipeline 17. Consecutively, the further data $y_{12}$, $y_{13}$, and $y_{14}$ are inputted at input 27 in this order and transmitted via the bus 28 to the data pipeline 17. Each such input operation causes the data pipeline 17 to effect a shift operation of data stored in one of the memories 16 to the next. After the shifting in of the vector $\vec{y}_1$ is completed each of the memories 16 holds one data word of the vector $\vec{y}_1$: memory 16 of a processing element 14 stores the data $y_{11}$ and the memorys 16 of the processing elements 13, 12, and 11 hold the data $y_{12}$, $y_{13}$, and $y_{14}$, respectively.

The data pipeline 17 and the cache memory 18 thus provide for a memory having two storage lines. The memory has a column for each of the processing elements 11, 12, 13, and 14: The memory 16 of the processing element 11 as well as the memory cell 19 constitute one column of memory which is private to the processing element 11 and which cannot be directly accessed by the other processing elements. Likewise the memory 16 of the processing element 12 together with the memory cell 20 constitute a column in the memory which is private to the processing element 12. The same applies analogously to the processing elements 13 and 14 and their respective memory cells 16 and 21, 22, respectively.

Further the shift parameter $S_i$ is inputted at input 27 and transferred via the input line 46 to the control unit 42. In the example considered here, the shift parameter $S_i$ equals 0. This is because prior to processing the data vectors $\vec{x}$ and vector $\vec{y}_1$ in the processor 10 no further shift operation is required.

Subsequently, the control unit 42 issues a read instruction via the control bus 43 to each of the processing elements 11, 12, 13, and 14. This causes the processing elements 11, 12, 13, and 14 to read the contents of their respective private memory columns. For example, processing element 11 reads contents of its memory 16 and its memory cell 19; likewise the other processing elements 12, 13, and 14 read contents of their memories 16 and memory cells 20, 21, and 22, respectively.

Next the control unit 42 issues a calculation instruction to each of the processing elements 11, 12, 13, and 14 via control bus 43. This causes each of the processing elements 11, 12, 13, and 14 to calculate the absolute difference between the data read from the corresponding private memory column, previously. In the case of the processing element 11 this means that the computing unit 15 calculates the absolute difference between the data $y_{14}$ and the data $x_4$. Likewise the computing units 15 of the processing elements 12, 13, and 14 calculate the absolute differences between the data $x_3$, $y_{13}$ and $x_2$, $y_{12}$ and $x_1$, $y_{11}$, respectively.

The calculation of the absolute differences in the processing elements 11, 12, 13, and 14 results in corresponding term signals which are representatives of the absolute differences. These term signals are outputted at the term signal outputs 30, 31, 32, and 33 and inputted into the adder 34. In response to the receipt of the term signals the adder 34 adds up all the term signals to form a sum signal which is outputted at the adder output 35. The sum signal is a result of the L1 norm calculation of the vector $\vec{x}$ and vector $\vec{y}_1$.

For further processing the L1 norm can be stored in the evaluation unit 36 under control of the control unit 42 which issues a corresponding instruction to the evaluation unit 36 via the control bus 45. Within the evaluation unit 36 the L1 norm of vector $\vec{x}$ and vector $\vec{y}_1$ is stored on the first storage location 37.

For many applications it is required not only to calculate one isolated L1 norm of two data vectors, but a long sequence of $L_1$ norms of one data vector and a plurality of other data vectors. Often the sequence of other data vectors is not completely arbitrary, but the sequential data vectors have a high degree of similarity. A similarity which is often encountered between a pair of sequential data vectors is that the later data vector can be obtained from the previous data vector by shifting the vector elements of the previous data vector by an amount of S shift operations and adding a sequence of S replacement vector elements.

Figures 2, 3:
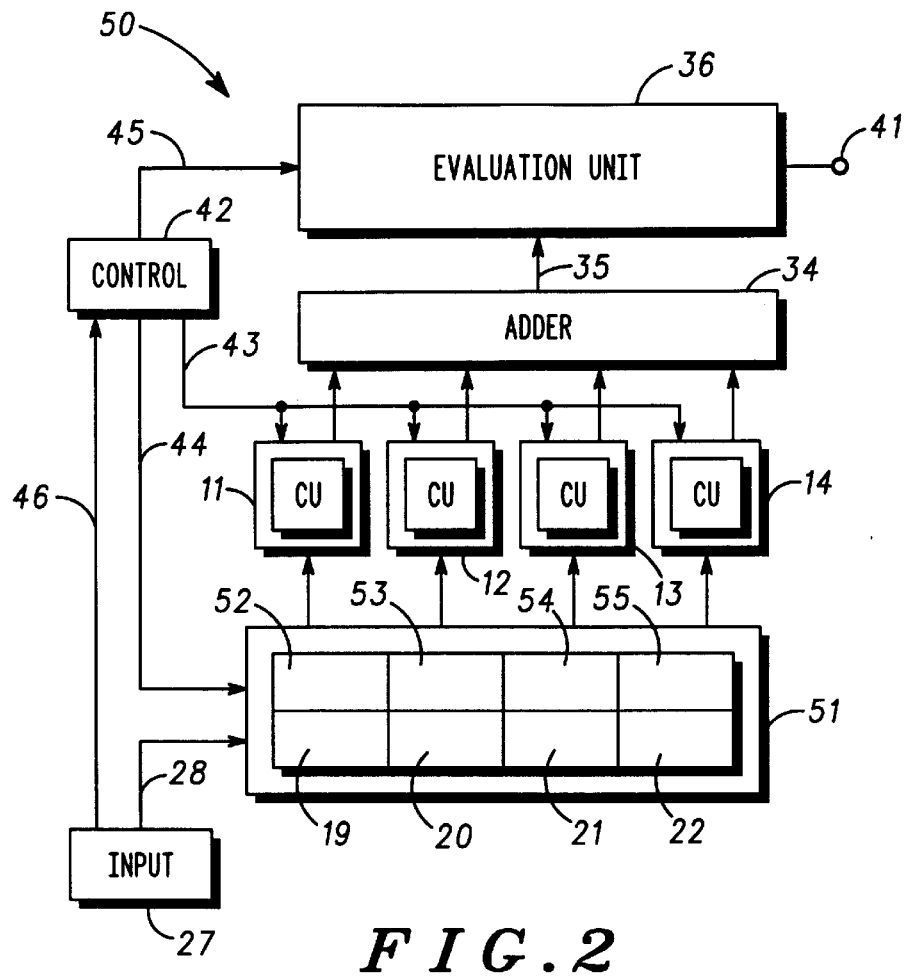
FIG. 2 illustrates a block diagram of a second computer processor that can incorporate an embodiment of the present invention.
FIG. 3 shows a number of data vectors which are inputs for L1 norm calculation.

Such a situation is explained in more detail by way of example with respect to FIG. 3. FIG. 3 shows first vector $\vec{y}_1$ as well as two subsequent vectors, vector $\vec{y}_2$ and vector $\vec{y}_3$. Like explained above with reference to FIG. 1 the vector $\vec{y}_1$ is shifted in the data pipeline 17 initially before the L1 norm of vector $\vec{x}$ and vector $\vec{y}_1$ is calculated by the processor 10. After the memories 16 are read and during the calculation of the term signals in the computing unit 15 already the next data vector $\vec{y}_2$ can be shifted in the data pipeline 17 in order to prepare the subsequent calculation of the L1 norm of the vector $\vec{x}$ and the vector $\vec{y}_2$.

The vector $\vec{y}_2$ has the data $y_{21}$, $y_{22}$, $y_{23}$, and $y_{24}$. The first data $y_{21}$ of the vector $\vec{y}_2$ equals the second data $y_{12}$ of the vector $\vec{y}_1$. Likewise the second and third data $y_{22}$ and $y_{23}$ of the vector $\vec{y}_2$ equal the third and the fourth data $y_{13}$ and $y_{14}$, respectively, of the vector $\vec{y}_1$. Only the fourth data $y_{24}$ of the vector $\vec{y}_2$ cannot be obtained from the prior vector $\vec{y}_1$. All the other data of the vector $\vec{y}_2$ is already present in the prior vector $\vec{y}_1$ and thus has already been stored in one of the memories 16 when the prior vector $\vec{y}_1$ is initially loaded. The data of the prior vector $\vec{y}_1$ is shifted up linearly by one dimension so that for example the data $y_{12}$ is transferred from the second to the first dimension in the vector $\vec{y}_2$, the data $y_{13}$ is transferred from the third to the second dimension and $y_{14}$ from the fourth to the third dimension.

Thus in the example considered here, the differential of the dimensions for which the data is shifted from one vector to the next is $S_1=1$ in this case. The value of the shift parameter $S_1$ at the same time indicates the number of consecutive data which have to be shifted in the data pipeline 17 in order to form the complete second vector $\vec{y}_2$ in that storage line to prepare the calculation of the second L1 norm of the vectors $\vec{x}$ and vector $\vec{y}_2$. In the example considered here, the only additional data which is required as a new input data is $y_{24}$.

Loading of the vector $\vec{y}_2$ is carried out under control of the control unit 42: The shift parameter $S_1=1$ is inputted via input 27 and input line 46 to the control unit 42. In response to this the control unit 42 issues an instruction to the data pipeline 17 to shift the vector $\vec{y}_1$ stored in the memories 16 for $S_1$ shift operations to the right. As $S_1$ equals 1 in this case, this results in $y_{14}$ being shifted to the memory 16 of the processing element 12 and likewise $y_3$ and $y_2$ being shifted to the memories 16 of the processing elements 13 and 14, respectively. Thereby the data $y_{11}$ is erased. At the same time the new data which distinguishes the new vector $\vec{y}_2$ from the previous vector $\vec{y}_1$ is shifted into the data pipeline 17 by inputting the corresponding data at the input 27 via the bus 28. A number of $S_1$ of such new data has to be entered; since is this case $S_1$ equals 1, this is only the data $y_{24}$.

As a result of shifting the former vector $\vec{y}_1$ for a number of $S_1$ operations to the right and concurrently shifting in a number of $S_1$ new data into the data pipeline 17, the new vector $\vec{y}_2$ is stored in the storage line provided by the memories 16 as a replacement for the previous vector $\vec{y}_1$. Once the shifting in of the vector $\vec{y}_2$ is accomplished, the control unit 42 issues a further read and consecutive calculate instruction to the processing elements 11, 12, 13, and 14 which in response calculate the absolute differences between the data stored in the corresponding private memory column.

Again the resulting term signals are added by the adder 34 and—as an option—transferred to the evaluation unit 36 and stored for example in the storage location 38. This allows to calculate the second L1 norm of the vector $\vec{x}$ and the vector $\vec{y}_2$ in just one processing interval, due to the fact that the loading of the new data vector $\vec{y}_2$ is done efficiently in the above described way. Once the L1 norm of the vectors $\vec{x}$ and vector $\vec{y}_2$ is available at the adder output 35 again it is stored under control of control unit 42 in the storage location 39 of the evaluation unit 36.

Next the L1 norm of the vector $\vec{x}$ and vector $\vec{y}_3$ is calculated according to the same principles: Like vector $\vec{y}_2$ differs from the vector $\vec{y}_1$ only by just one linear shift operation and one new data the same applies for the vector $\vec{y}_3$ with respect to the vector $\vec{y}_2$. Again—preferably during the calculation of the absolute differences in the processing elements—the shifting of the former vector $\vec{y}_2$ is performed under control of the control unit 42, so that the data $y_{24}$, $y_{23}$, and $y_{22}$ are stored in the memory 16 of the processing elements 12, 13, and 14, respectively. The new data $y_{34}$ is shifted in concurrently, like explained above.

As an option each time a new data vector is shifted in the data pipeline 17, the corresponding shift parameter $S_i$ is transmitted via input line 46 to the control unit 42. This allows that consecutive vectors $\vec{y}_i$ and vector $\vec{y}_{i+1}$ differ in a variable number $S_i$ of consecutive new data. Alternatively, the shift parameter $S_i$ can be a fixed parameter, if consecutive vectors $\vec{y}_i$ always differ in the same amount of new consecutive data. In this case it is sufficient to transmit the shift parameter S only once at the beginning of the processing.

After all required L1 norms of the vector $\vec{x}$ and the sequence of vectors $\vec{y}_i$ have been calculated, all the results are present in the storage locations 37, 38, 39 . . . of the evaluation unit 36. The results are compared by a comparator 40, and the result of this comparison is outputted at the output 41. If, for example, best match between the vector $\vec{x}$ and one of the vectors $\vec{y}_i$ has to be found, the smallest L1 norm being present in the evaluation unit 36 indicates such a best match. In this case the smallest L1 norm is selected by the comparator 40 and information indicative of the best matching vector pair $(\vec{x}, \vec{y}_i)$ is outputted at the output 41.

With reference to FIG. 2 now, an alternative embodiment of the processor 10 of FIG. 1 is described in the following. Like elements shown in FIG. 1 and 2 are denoted by the same reference numerals.

The processor 50 differs from the processor 10 of FIG. 1 in that the data pipeline 17 is not realized by number of concatenated memories 16 of the processing elements 11 to 14. The two storage lines required for storage of two data vectors vector $\vec{x}$ and vector $\vec{y}_i$ at a time are provided by a cache memory 51 which contains two lines and one column for each of the processing elements 11 to 14. Each of the columns of the cache memory 51 is private to one of the processing elements 11 to 14: The column of the cache memory 51 having memory cells 19 and 52 is private to the processing element 11; memory cells 20, 53 are private to the processing element 12; memory cells 21, 54 are private to the processing elements 13, and memory cells 22, 55 are private to the processing element 14.

Thus, in the processor 50 the neighboring memory cells 52 to 55 of the cache memory 51 provide for the equivalent functionality of the data pipeline 17 like explained with reference to FIG. 1, the difference being that the data pipeline 17 is realized outside the processing elements 11 to 14. The operation of the processor 50 is equivalent to the operation of processor 10 like explained with reference to FIG. 1.

A processor of the type of processors 10 and 50 as explained with reference to FIG. 1 and 2 can advantageously be realized based on a computer processor disclosed in above-identified related invention No. 9. Such a computer processor can be configured to provide for the functionalities required to perform L1 norm calculations like the processors 10 and 50. This requires that—contrary to the initial purpose of the hardware architecture—the input log converters and inverse-log converters of the computer processor are disabled. The disabling of the log and inverse-log converters transforms the computer processor of the type disclosed in above-identified related invention No. 9 into a processor in accordance with the principles of the invention provided that the control unit of the computer processor is programmed to implement the L1 norm calculations as described above.

Figure 4:
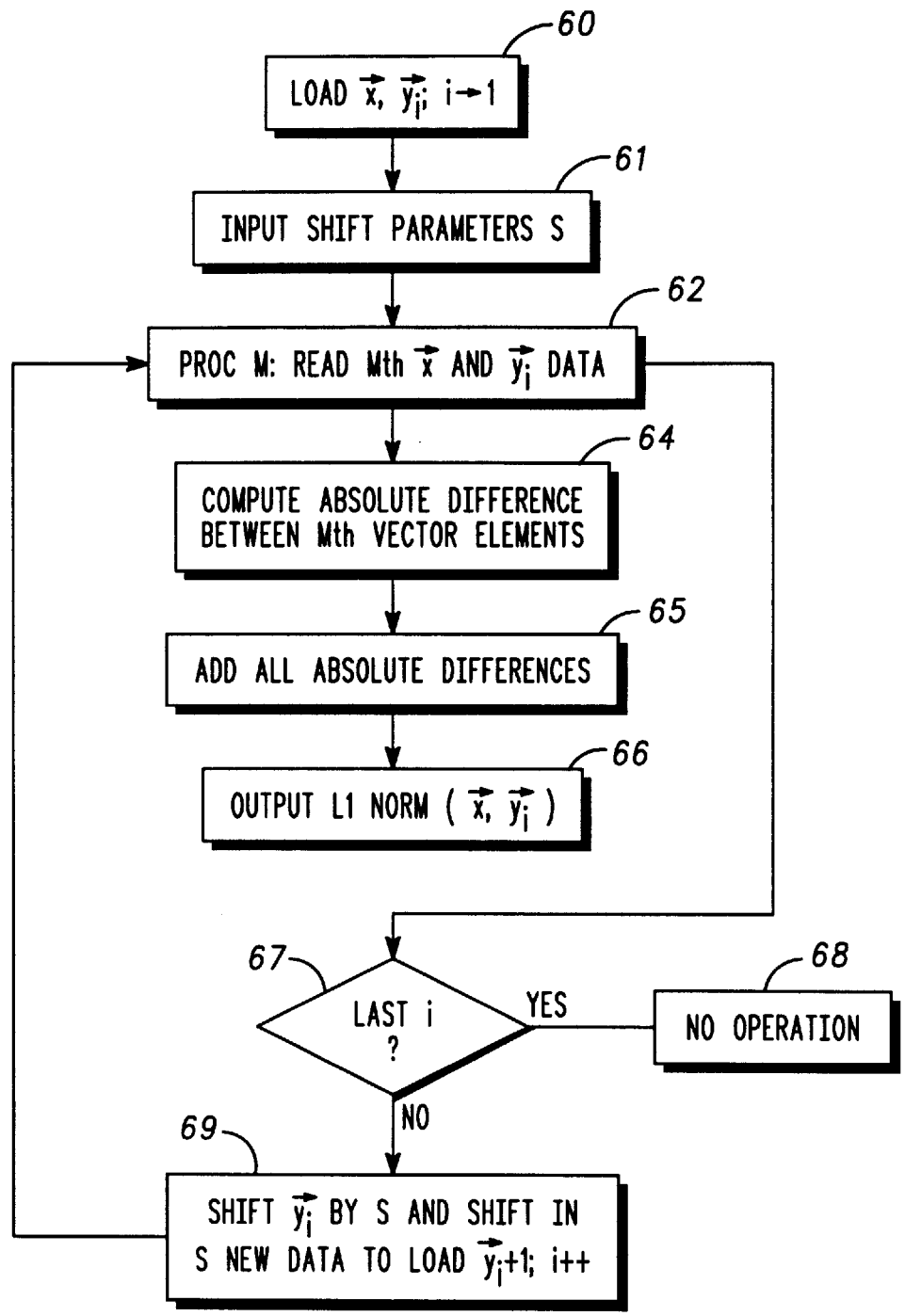
FIG. 4 shows a flow diagram of one embodiment of the invention for calculating an L1 norm.

With reference to FIG. 4 now, a method for calculating an L1 norm according to the invention is described in the following by way of example. For carrying out this method a parallel computer processor is required—for example of the type as explained with reference to FIG. 1 and 2. In such a parallel computer processor in the more general case a number of N processing elements is present which can carry out arithmetic calculations in parallel. Another hardware requirement is the availability of a memory which has at least two storage lines for storage of a data vector of dimension N in each of the storage lines.

Each column in the memory is private to one processing element, so that other processing elements cannot directly access the corresponding data. This means that an arbitrary one of the processing elements—designated as processing element M in the following—has private access to the data stored in the Mth column of the memory. As a consequence the processing element M reads and processes the Mth data of the data vectors stored in the storage lines. Another feature provided by the hardware on which the method is carried out is the coupling of the N processing elements by a data pipeline which allows to exchange data from a processing element M−1 to a processing element M whereby a data pipeline results. Such a data pipeline can be compared to a shift register.

The method which is explained with reference to FIG. 4 allows to efficiently calculate a sequence of L1 norms of a first data vector $\vec{x}$ and a sequence of data vectors $\vec{y}_i$.

Initially, in step 60 the index i is set to 1. Also in step 60 the vector $\vec{x}$ is loaded in one of the storage lines of the memory and the data vector $\vec{y}_1$ is loaded into the other storage line of the memory.

In step 61 the shift parameter S is inputted. Like explained above with reference to FIG. 1 and 2 the shift parameter S is indicative of the number of consecutive new data for the vector $\vec{y}_{i+1}$ with respect to the vector $\vec{y}_i$. The amount of S new data has to be provided between consecutive L1 norm calculations to update the memory. In the example considered here with reference to FIG. 4 the shift parameter S is constant and remains unchanged for all data vectors to $\vec{y}_i$. Hence it is sufficient to input the shift parameter S once in step 61. In step 62 all the N processing elements access their private column in the memory to read the corresponding vector $\vec{x}$ and vector $\vec{y}_i$ data. In the case of the processing element M this means that the data $x_M$ and the data $y_{iM}$ is read.

In the next step 64 each of the N processing elements compute the absolute difference between the data read from the private column in step 62. For the processing element M that means that the absolute difference between the data $x_M$ and the data $y_{iM}$ is calculated in step 64. Since the N processing elements can work in parallel, a number of N such calculations take place in step 64.

In step 65 all the results of the calculations performed in step 64 are added so that the L1 norm of the vector $\vec{x}$ and the vector $\vec{y}_i$ results. In step 66 this resulting L1 norm is outputted.

In parallel to the computation of the L1 norm in steps 64 to 66 it is checked in step 67 whether more L1 norms are to be computed. This is done by checking the value of the index i. If no further L1 norms other than the ones being computed in parallel are required, then no operation is carried out in step 68. If more L1 norms are to be calculated, the control goes to step 69.

In step 69 the previous data vector $\vec{y}_i$ is replaced by the consecutive vector $\vec{y}_{i+1}$. This is done by shifting the data of the vector $\vec{y}_i$ by a number S shift operations through the data pipeline and at the same time shifting in a number S new data. If for example S equals 2, the data of vector $\vec{y}_i$ is shifted twice, so that the data $y_{i1}$ and $\vec{y}_{i2}$ is erased. In order to complete the consecutive data vector $\vec{y}_{i+1}$ therefor the missing data $y_{iM-1}$ and $y_{iM}$ is shifted into the data pipeline. In addition the parameter i is incremented by 1. Then the control returns back to step 62 for the calculation of the next L1 norm in steps 64–66 and for the initialization of an even further L1 norm calculation in the steps 67 and 69—if any.

One application of the method explained with reference to FIG. 4 is video compression. To perform video compression, there is often a need to perform motion estimation on frames of video. One known technique to establish an estimated motion vector is full search block matching. This is one possible approach to find a best match between a block in a current video frame and another block in a previous video frame. Block matching is done by applying a block taken from the current video frame to a previous video frame and calculate the corresponding L1 norms in order to find the best match: The blocks from the current and the previous video frame which have the smallest L1 norm are considered to be a best match.

Figure 5:
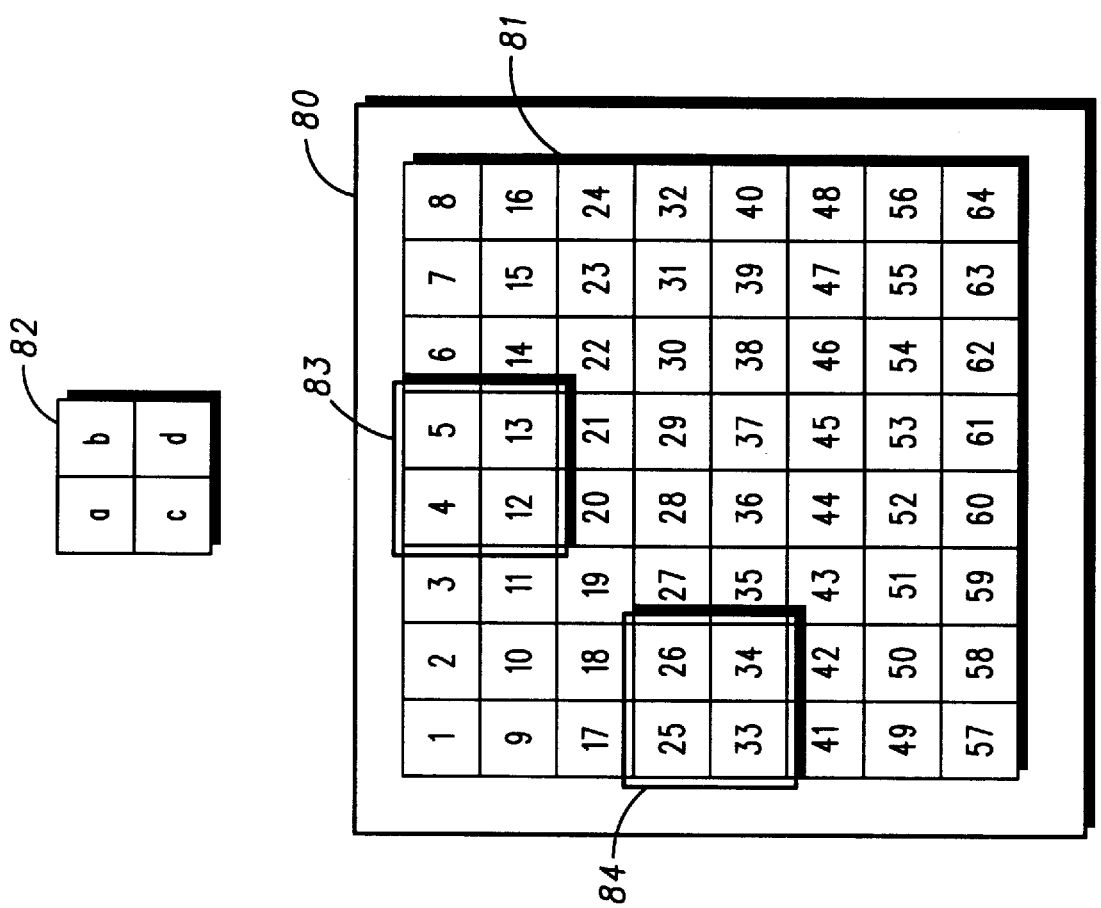
FIG. 5 schematically illustrates full search block matching for a 2×2 block within a 8×8 frame.

FIG. 5 shows an example for such an application. FIG. 5 shows a video system 80 which has a video matrix 81 of 8×8 pixels. The pixels of the video matrix 81 are numbered from 1 to 64. The video matrix 81 is used by the video system 80 to display a sequence of video frames. Such a video system 80 can be employed for a computer display, a digital video telephone, video conferencing or other applications. In such environments effective video compression is important in order to efficiently use the available bandwidth for data transmission—for example via ISDN telephone lines in the case of video telephoney and video conferencing.

It is often the case that from one video frame to the next the biggest portion of the consecutive frames remain unchanged. For example a moving object can cause the difference from one frame to the next. This information is advantageously used to dramatically reduce the band width required to transmit consecutive video frames. This requires that the displacement of the moving object from one video frame to the next is detected or at least estimated.

FIG. 5 also shows a block 82 which is a 2×2 block of pixels taken from a current video frame. The block 82 is representative of a picture detail of the current video frame which contains a moving object. This picture detail in the current video frame is "cut out" of the current video frame, so that the block 82 results. The pixels within the block 82 are designated as a, b, c, and d. In order to determine or estimate a motion vector—like required for coding MPEG-standard—the equivalent of the picture detail of the current video frame which is represented by the block 82 is to be found in the previous video frame.

Like any of the video frames the previous video frame has the pixels 1 to 64 in the video matrix 81. Each of the pixels 1 to 64 has a certain value in the video matrix 81. Most of the values of the pixels 1 to 64 typically remain unchanged from the previous to the current video frame, especially if the picture which is displayed is a still picture in which only one or more objects move. Typically, situations like this are encountered when the picture of a television news speaker is transmitted in which basically only the head of the television news speaker moves, but all the rest of the picture remains constant from the previous video frame to the current video frame.

In order to detect or estimate the previous position of the picture detail of the current video frame which is represented by the block 82 the following approach is taken: The block 82 is moved step by step on the previous video frame. For each step the L1 norm of the block 82 and the values of the underlying pixels of the video matrix 81 is calculated. The block of pixels within the previous video frame for which the value of the L1 norm takes an absolute minimum is considered to be a good estimate of the previous position of the picture detail which is represented by the block 82. From this estimated position in the previous video frame of the block 82 and the actual position of the block 82 in the current video frame a motion vector is determined.

In the following it is assumed that the block 82 which has pixels having values a, b, c, and d corresponds to the pixel positions 4, 5, 12, and 13—block 83—in the video matrix 81 in the current video frame. In order to determine the motion vector, the previous position of the block 82 in the previous video frame of the video matrix 81 has to be determined. By way of example, in this case the search for the previous position of the block 82 is started in the center line of the video matrix 81 which starts with the block 84 comprising the pixel positions 25, 26, 33, and 34.

In the following the value v of an arbitrary pixel position p—with p ranging from 1 to 64—within video matrix 81 is referred to as v (p). The value v(p) of a pixel p typically comprises at least gray scale or color information. For simplicity in the following only gray scale information will be considered. If the search for a best match starts at the block 84 in the video matrix 81 the first L1 norm which has to be calculated for this purpose is between the values of the pixel of the block 82 and the block 84. The initial block 84 is the first candidate to be examined as a best match.

For this purpose the block 82 is transposed into data vector $\vec{x}_p$, where $$\vec{x}_p = \begin{pmatrix} a \\ c \\ b \\ d \end{pmatrix}. \qquad \text{(Equation 5)}$$

The transposition of the block 82 in to the vector $\vec{x}_p$ is done by concatenating the data of the pixel values contained in the block 82 (a, b, c, and d) into one linear sequence. The first portion of the sequence is corresponding to the first column of the block 82 which is the sequence "a, c". The second portion of the sequence corresponds to the second column in the block 82 which is "b, d". In the example considered here, this results in the sequence a, c, b, and d containing in this order the data for the vector $\vec{x}_p$.

An analogous operation is carried out for the blocks within the previous video frame for the video matrix 81 which are to be examined for a best match. Like explained with reference to the block 82 also the first candidate for a best match which is the block 84 is transposed into a vector $\vec{y}_1$, where $$\vec{y}_1 = \begin{pmatrix} 25 \\ 33 \\ 26 \\ 34 \end{pmatrix}. \qquad \text{(Equation 6)}$$

Again the first and the second column of the block 84 are concatenated in order to form the resulting vector $\vec{y}_1$. This is done in the same order as for the block 82. In the following the L1 norms of the vectors $\vec{x}_p$ and $\vec{y}_1$ is to be calculated:

$$L1(\vec{x}_p, \vec{y}_1) = |a-25|+|c-33|+|b-26|+|d-34| \qquad \text{(Equation 7)}.$$

To prepare the following L1 norm calculation, the block 84 is moved one pixel position to the right, so that it covers the pixels 26, 27, 34, and 35 in the video matrix 81. Again the block 84 is transposed into a vector $\vec{y}_2$ in the same way as described above. This results in a vector $\vec{y}_2 = (26, 34, 27,$ and 35). Consequently, the L1 norm to be calculated is $$L1(\vec{x}_p, \vec{y}_2) = |a-26|+|c-34|+|b-27|+|d-35| \qquad \text{(Equation 8)}.$$

When the block 84 is moved one step further to the right, a vector $\vec{y}_3 = (27, 35, 28, 36)$ results which leads to an L1 norm calculation according to the following equation:

$$L1(\vec{x}_p, \vec{y}_3) = |a-27|+|c-35|+|b-28|+|d-36| \qquad \text{(Equation 9)}$$

If the block 84 is moved in the following pixel position by pixel position from the left to the right this requires a total of 8 L1 norms to be calculated. The last L1 norm to be calculated for the center line is the L1 norm for the vector $\vec{x}_p$ and vector $\vec{y}_8$, where $\vec{y}_8=(31, 39, 32, 40)$.

Figure 6:
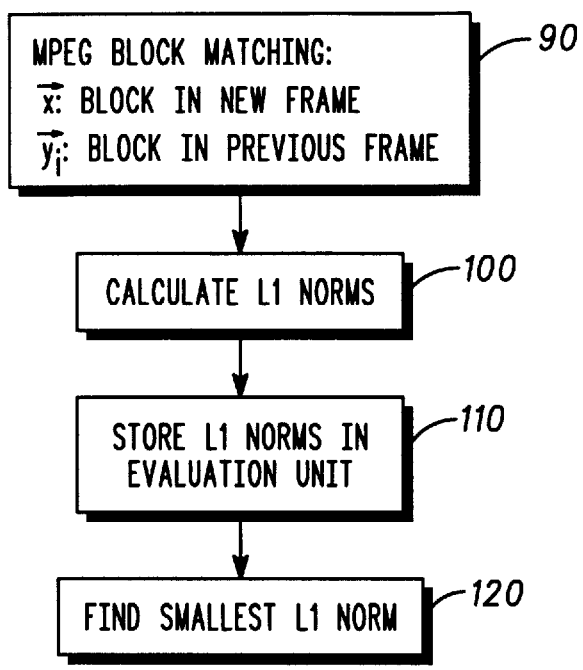
FIG. 6 shows a flow diagram of an embodiment of a method of performing MPEG block matching.

For these L1 norm calculations a processor of the type as explained above for example with reference to FIGS. 1 and 2—as well as a method as explained with reference to FIG. 4 can advantageously be used. This is explained in more detail with reference to FIG. 6.

To carry out a block matching for data compression according to the MPEG standard in step 90 the first block is selected in the current video frame for which a best match is to be found in the previous video frame. Typically the selected block is representative of a moving picture detail within the previous and current video frames. The aim is to find a best match of the first block in the current video frame and another block in the previous video frame for motion estimation. For this purpose the first block is transposed into a vector $\vec{x}$ and the second block is transposed in the same way into a vector $\vec{y}_i$.

In practice a large number of vectors $\vec{y}$ are selected as candidates for a best match and therefor a large number of subsequent L1 norms have to be calculated. The calculation of the L1 norms takes place in step 100 according to the principles devised by the present invention.

In step 110 the resulting L1 norms are stored in an evaluation unit of the type of evaluation unit 36 as explained with reference to the FIG. 1 and 2. In step 120 the evaluation unit compares the L1 norms of different data vectors to find the smallest L1 norm and thereby the best matching vector pair.

We claim:

1. A method for calculating an L1 norm of a first and a second data vectors in a parallel computer processor, said first and second data vectors having first and second data vector elements, said processor comprising:
    a plurality of processing elements,
    a data pipeline coupling said processing elements,
    a memory means having at least two storage lines, each column of said memory means being private to one of said processing elements,
    said method comprising the steps of:
    a) loading said first data vector in a first one of said storage lines;
    b) loading said second data vector in a second one of said storage lines;
    c) each of said processing elements reading of first and second data vector elements stored in its private column in said memory means;
    d) each of said processing elements calculating the absolute difference between said data vector elements read in step c) to form a plurality of term signals;
    e) adding all said term signals from said plurality of term signals;
    f) calculating a further L1 norm of said first data vector and a further second data vector, said further second data vector differing from said second data vector only in a number of consecutive data vector elements;
    g) shifting said second data vector through said data pipeline for said number of shift operations and concurrently shifting in said consecutive data vector elements into said processing elements being situated at the beginning of said data pipeline;
    h) each of said processing elements calculating the absolute difference between said first data vector elements read in step c) and said shifted data vector elements of said further second data vector to form a second plurality of term signals; and
    i) adding all said term signals from said second plurality of terms signals.

2. The method according to claim 1 whereby said steps f) to h) are carried out repeatedly for calculating L1 norms of said first data vector and consecutive further second data vectors.

3. A method for finding a best match between a first block in a current video frame and a second block in a previous video frame, said step of finding a best match comprising the steps of:
    a) selecting a first candidate for said second block in said previous video frame;
    b) transposing said first block in a first data vector and transposing said first candidate for said second block in a second data vector;
    c) calculating an L1 norm of said first and said second data vectors in a parallel computer processor, said processor comprising
        a plurality of processing elements,
        a data pipeline coupling said processing elements,
        a memory means having at least two storage lines, each column of said memory means being private to one of said processing elements,
        said step c) of calculating said L1 norm comprising the sub-steps of:
        c1) loading said first data vector in a first one of said storage lines;
        c2) loading said second data vector in a second one of said storage lines;
        c3) each of said processing elements reading of data stored in its private column in said memory means;
        c4) each of said processing elements calculating the absolute difference between said data read in step c3) to form a plurality of term signals;
        c5) adding all said term signals from said plurality of term signals to form a first sum;
    d) selecting a further candidate for said second block in said previous video frame, said further candidate being linearly shifted with respect to said first candidate in said previous video frame so that said corresponding further second data vector differs from said second data vector only in a number of consecutive data;
    e) calculating a further L1 norm of said first data vector and said further second data vector
    said step e) of calculating comprising the sub-steps of:
    f) shifting said second data vector through said data pipeline for said number of shift operations and concurrently shifting said consecutive data into said processing elements;
    g) each of said processing elements calculating the absolute difference between said data of said first data vector read in step c3) and said shifted data of said further second data vector to form a second plurality of term signals;
    h) adding all said term signals from said second plurality of term signals to from a second sum;
    i) deciding whether said first or said second candidate are a better match by comparing said first and second sums.

4. The method of claim 3 whereby said steps d) to h) are carried our repeatedly for a plurality of candidates until it is decided which candidate is the best match by comparing said sums.

5. A parallel computer processor for calculating an L1 norm of a first and a second data vector, said parallel computer processor comprising a plurality of processing elements each of which having a term output, a data pipeline coupling said processing elements, a memory means having at least two storage lines, each column of said memory means being private to one of said processing elements, adder means being coupled to said term outputs of said processing elements, control means for:
 a) loading said first data vector in a first one of said storage lines;
 b) loading said second data vector in a second one of said storage lines;
 c) issuing a read instruction to each of said processing elements to perform a read operation of data stored in said private columns in said memory means;
 d) issuing a calculation instruction to each of said processing elements to calculate the absolute difference between said data read in step c) to form a plurality of term signals at said term outputs;

said adder means adding all said term signals from said plurality of term signals.

6. The parallel computer processor according to claim 5, said parallel computer processor being adapted to calculate a further L1 norm of said first data vector and a further second data vector, said further second data vector differing from said second data vector only in a number of consecutive data, said control means being adapted to f) issue a third instruction to said data pipeline for shifting said second data vector through said data pipeline for said number of shift operations and concurrently shifting in said consecutive data into said processing;

g) issue a fourth instruction to each of said processing elements to calculate the absolute difference between said data of said first data vector read in step c) and said shifted data of said further second data vector to form a second plurality of term signals.

7. The parallel computer processor according to claim 6, said parallel computer processor being adapted to carry out said steps f) to g) under control of said control means repeatedly for calculating L1 norms of said first data vector and consecutive further second data vectors.

* * * * *